United States Patent Office 3,472,797
Patented Oct. 14, 1969

3,472,797
EPOXY RESIN HARDENERS DERIVED FROM AQUEOUS ALKALI-EXTRACTED BARK PHENOLIC ACIDS
George G. Allan, Seattle, Wash., assignor to Weyerhaeuser Company, Tacoma, Wash., a corporation of Washington
No Drawing. Continuation-in-part of application Ser. No. 596,821, Nov. 25, 1966. This application Jan. 30, 1968, Ser. No. 701,538
Int. Cl. C08g 30/10
U.S. Cl. 260—2          6 Claims

ABSTRACT OF THE DISCLOSURE

A curable composition of (1) an epoxy compound, and (2) a water-insoluble bark phenolic ester product derived by the reaction of an aqueous, alkali-extracted bark phenolic acid with an alcohol. The alcohol used for esterification of the bark phenolic acid may be monohydric, polyhydric, and may contain terminal unsaturation.

---

This application is a continuation-in-part of my co-pending application Ser. No. 596,821, filed Nov. 25, 1966, now abandoned for "Resin Hardeners Derived From Bark Phenolic Acids," which is a continuation-in-part of Ser. No. 399,881, filed Sept. 28, 1964, now abandoned for "Esters of Bark Phenolic Acids."

This invention relates to a composition of matter derived from the combination of bark phenolic acids and alcohols or polyalcohols useful as hardeners for epoxy resins.

Heretofore, the lumber industry has been plagued with wasteful-by-products in the production of lumber and wood products. One of these by-products is the bark from the tree.

In recent years, much time and effort have been expended on finding a use for this wasteful by-product U.S. Patent No. 2,890,231, issued to Clark C. Heritage and Lionel E. Dowd, describes a process for extracting chemical products from bark with an alkaline solvent. The resulting products from this process include an alkaline solution of bark phenolic acids. Analysis of the bark phenolic acids shows that they contain up to 15% by weight of carboxyl groups. At their sodium salts, the bark phenolic acids are hydrophilic and are water soluble. Although the bark phenolic products have structures potentially useful as hardeners or curing agents, their lack of solubility in and compatibility with various resins excludes them from use as such. They currently find usage only in outlets such as dispersants for drilling mud compositions, cement additives, pesticides and the like.

Previous attempts to use the salts of bark phenolic acids in resins have been confined to modification of conventional water-soluble phenol formaldehyde resins of the type used in plywood adhesives. These efforts to replace phenol have not been notably successful technically and are economically unattractive. Other attempts to use this product in the free phenolic acid form have failed because of its partial water solubility and its failure to dissolve completely in applicable organic solvent systems.

An object of this invention is to provide a new composition of matter derived from bark phenolic acids that is useful as a hardener or curing agent for resins and one that is linked to the resin structure.

Another object of this invention is to provide a new composition of matter from bark phenolic acids that is hydrophobic or organic solvent soluble useful in resins used in coatings, adhesives, and encapsultants.

In this invention, the bark phenolic acids are transformed into organic solvent soluble products by esterification of their carboxylic acid groups using an alcohol. These esters are new compositions of matter and may be represented by the following formula:

HOOC-bark phenolic acid-COOH+2ROH→
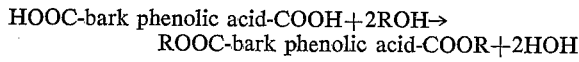
ROOC-bark phenolic acid-COOR+2HOH wherein R in the above formula may be an alkyl group or substituted alkyl group ranging from 1 to 18 carbon atoms. Although a variety of alcohols and polyols can be used as represented by ROH in the above formula, isobutanol is the preferred choice from among the simple aliphatic alcohols. Accordingly, the alcohol represented by ROH in the above formula may be selected from the group consisting of methanol, ethanol, isopropanol, n-propanol, n-butanol, isobutanol, 2-ethylhexanol, dodecanol, tetradecanol, hexadecanol, and octadecanol.

Functional groups of various types can be introduced into the bark phenolic acids by esterification using esterifiable alcohols containing the desired function. For example, allyl alcohol having the formula $CH_2=CH-CH_2OH$ can be used wherein double bonds are desired to be introduced. Also, hydroxyl groups may be introduced into the bark phenolic acids by esterification using esterifiable polyols as, for example, those containing 2 or 3 hydroxyl groups and from 2 to 80 carbon atoms. Exemplary of polyols which may be used are ethyleneglycol, 1,3 - butyleneglycol, 1,2,6 - hexanetriol, polyethyleneoxydiols having average molecular weights ranging from 200 to 500, polypropyleneoxydiol having average molecular weights ranging from 400 to 1200 and polybutyleneoxydiol having an average molecular weight of 500, diethyleneglycol, triethyleneglycol, propyleneglycol, and polyepichlorohydringlycol. The esters formed using the polyols find wide utility in coatings, curing agents for epoxy resins and as modifiers for various resins.

The reaction between the bark phenolic acids and the alcohols is carried out in the presence of a catalyst. The catalyst in this instance is an acid catalyst selected from the group of which sulfuric acid, hydrochloric acid, phosphoric acid or mixtures thereof would be typical. The reaction may be carried out either at ambient or elevated temperatures, though at lower temperatures internal condensations are minimized and higher saponification values are attained. Accordingly, the product may be formed by adding the sulfuric acid catalyst, bark phenolic acids or salt thereof and the esterification alcohol and stirring for up to about 70 hours, depending on the alcohol used. Appropriate solvents such as acetone or methylethylketone may be used as reaction diluents if necessary to reduce viscosity or promote reaction. The mixture can be diluted with water and centrifuged to remove excess acid catalyst in the aqueous phase. The product is obtained in 80% overall yield by evaporation of the solution, preferably under reduced pressure and the excess alcohol may be removed and recycled. The product is a black powder and is readily soluble in organic solvents such as methylethylketone and isobutanol. Saponification of the product shows that it contains about 15% of combined alcohol and that it is about 70% esterified. There are about up to 30% of the original carboxyl groups unreacted or unesterified in the final product. However, the solubility and compatibility deficiencies of the bark phenolic acid are overcome since the overall product may be characterized as an ester and thus organic solvent soluble or hydrophobic.

The esters of the bark phenolic acids are chemically reactive with commercial epoxy resins. Because they are polyfunctional in regard to carboxyl substitution they can act as hardeners or curing agents in similar fashion to the well-known organic dibasic acids or acid anhydrides. The unique structure of the esterified bark phenolic acids, however, gives particularly desirable properties in many systems. In addition, the product is potentially lower in cost than some of the conventional acid anhydride curing agents.

Epoxy resins cured with the esters of bark phenolic acids are useful for any of the purposes in which conventionally cured resins would be employed. This includes such applications as laminating, encapsulating, coatings and adhesives. The bark phenolic acid ester cured resins have been found to be particularly useful in the preparation of durable coatings.

The esters of bark phenolic acids are useful as hardeners for a number of commercial resinous materials which may be selected from a group consisting of alicylic polyepoxides such as vinyl-cyclohexene dioxides, limonene dioxide, dicyclopentadiene dioxide, ethylene-glycol-bis(3,4 - epoxytetrahydrodicyclopentadien-8-yl)-ether, (3, 4-epoxytetrahydrodicyclopentadien - 8 - yl)-glycol ether; epoxidized polybutadienes, or expoxidized copolymers of butadiene with ethylenically unsaturated compounds such as styrene or vinyl acetate; epoxy compounds containing two epoxy-cyclohexyl residues such as diethyleneglycol-bis-(3,4-epoxy-cyclohexane-carboxylate), bis-3,4-epoxy-cyclohexylmethyl succinate, 3,4-epoxy - 6 - methyl-cyclohexylmethyl-3,4-epoxy-6-methyl - cyclohexane-carboxylate and 3,4-epoxy-hexahydrobenzal-3, 4-epoxy - cyclohexane-1,1-dimethanol.

Further suitable are polyglycidyl esters such as result from the reaction of a dicarboxylic acid with epichlorohydrin or glycerol dichlorohydrin in the presence of alkali. Such polyesters can be derived from aliphatic dicarboxylic acids such as succinic or adipic acid or more especially from aromatic dicarboxylic acids such as phthalic or terephthalic acid. There may be mentioned, for example, diglycidyl adipate and diglycidyl phthalate.

There are further suitable basic polyepoxy compounds such as are obtained by reacting a primary or secondary aliphatic or aromatic diamine, such as aniline, p-toluidine, 4,4' - diamino - diphenylmethane, 4,4' - di(monomethylamino)-diphenylmethane or 4,4'-diamino - diphenylsulphone with epichloro-hydrin in the presence of alkali.

Preferred use is made of polyglycidyl ethers such as are obtained by etherifying a dihydric or polyhydric alcohol or dihydric phenol or polyhydric phenol with epichlorohydrin or disclorohydrin in the presence of alkali. These compounds may be derived from glycols such as ethyleneglycol, diethyleneglycol, triethyleneglycol, 1,3 - propyleneglycol, 1,4-butyleneglycol, 1,5-pentanediol, 1.6-hexanediol, 2,4,6-hexanetriol, glycerol and more especially from dihydric phenols or polyhydric phenols such as resorcinol, pyrocatechol, hydroquinone, 1,4-dihydroxynaphthalene, condensation products of phenol with formaldehyde of the type of the resoles or novolaks, bis-[para-hydroxyphenyl] - methane, bis [para - hydroxyphenyl]-methylphenylmethane, bis-[para - hydroxyphenyl]-p-tolylmethane, 4,4' - dihydroxydiphenyl, bis-[para-hydroxyphenyl]-sulphone and more especially bis [para-hydroxyphenyl]-dimethylmethane.

Particularly suitable are epoxy resins that are liquid at room temperature, for example, those prepared from bis-(para-hydroxyphenyl)-dimethylmethane (bisphenol A) which contain about 3.8 to 5.8 epoxide equivalents per kg. Such epoxy resins correspond, for example, to the average formula:

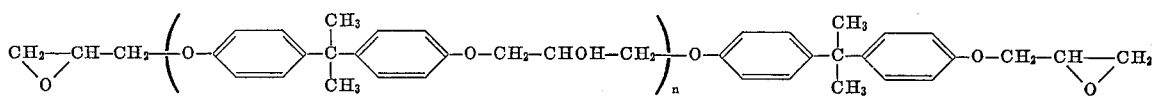

in which $n$ is a whole or fractional small number from 0 to 2.

Accordingly, when $n$ in the above formula is 0, the typical reaction may be indicated as follows:

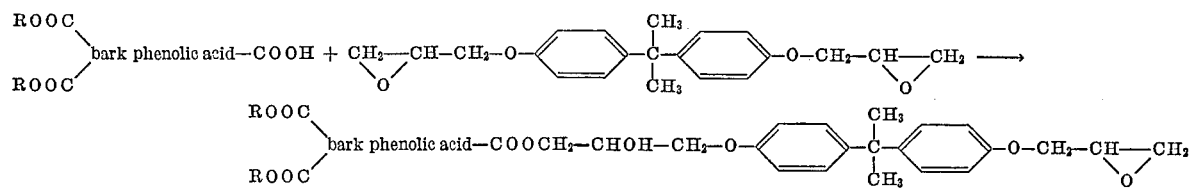

The amount of hardener used may range between 10 and 75% weight basis.

In order to further illustrate the invention the following examples are provided.

EXAMPLE I

The isobutyl ester of bark phenolic acid was first formed by reacting isobutanol with bark phenolic acid. Then, 30 parts of the isobutyl ester of the bark phenolic acid was blended with 70 parts by weight of a commercial diglycidyl ether of bisphenol A resin, coated on a pipe and cured. The coating was applied in a conventional manner and the properties of the blend separately compared with those of a commercial resin having coal tar as a component. The properties of the two coatings are tabulated in the following table:

TABLE I

| Property | Example I | Coal tar "Tarset" |
|---|---|---|
| Flexural strength (p.s.i.) | 6,640 | 1,630 |
| MOE in flexure (p.s.i.×1,000) | 445 | 58 |
| Tensile Strength (p.s.i.) | 2220 | 649 |
| MOE in tension (p.s.i.×1,000) | 1160 | 127 |
| Impact Strength (ft. lbs.) | 0.27 | 0.22 |
| Taber abrasion (wt. loss in gms.) | 0.062 | 0.073 |
| Barcol hardness No | 84 | 46 |

EXAMPLE II

The isobutyl ester of bark phenolic acid was blended with various commercial epoxy resins, formed into a film and tested. The results of these tests are tabulated below:

pounds obtained by reacting an amine with epichlorohydrin in the presence of alkali, and mixtures thereof.

TABLE II

| Isobutyl ester of bark phenolic acid | Commercial diglycidyl ether of bisphenol A | Commercial vinylcyclohexene dioxide | Commercial epoxidized butadiene polymer | Wt. | Conventional plasticizing component | Film appearance |
|---|---|---|---|---|---|---|
| 0.895 | | 0.895 | | | | Gloss, hard, brittle. |
| 0.895 | 0.45 | 0.45 | | | | Do. |
| 0.895 | 0.895 | | | | | Do. |
| 8.0 | 8.0 | 4.0 | | | | Glossy, hard, tough. |
| 4.0 | 12.0 | 4.0 | | | | Glossy, brittle. |
| 2.6 | 2.6 | | | | | Hard, tough, slightly pliable. |
| 0.5 | 0.2 | 0.2 | | 0.1 | Allyl 9, 10-epoxystearate | Glossy, tough, brittle. |
| 0.5 | 0.2 | 0.2 | | 0.1 | Octylene-1,2-epoxide | Do. |
| 0.4 | 0.4 | 0.1 | | 0.1 | A liquid alkyd phosphate | Glossy, brittle. |
| 0.4 | 0.4 | | | 0.2 | Epoxidized alkyd | Glossy, pliable, soft. |
| 0.2 | | | | 2.0 | ----do---- | Flexible. |
| 0.4 | | | | 2.0 | ----do---- | Do. |
| 1.0 | | | | 2.7 | ----do---- | Hard, tough. |
| 0.4 | | 0.2 | 0.4 | | | Glossy, brittle. |
| 0.4 | | | 0.6 | | | Tough, pliable. |
| 0.5 | | | 0.4 | 0.1 | Polypropyleneoxydiol | Hard, slightly pliable. |
| 0.5 | | | 0.3 | 0.2 | ----do---- | Do. |
| 0.5 | | | 0.4 | 0.1 | Polyepoxy glyceryl ester | Do. |
| 0.5 | | | 0.3 | 0.2 | ----do---- | Do. |
| 0.5 | | | 0.4 | 0.1 | Allyl 9,10 epoxystearate | Do. |
| 0.5 | | | 0.3 | 0.2 | ----do---- | Do. |
| 0.5 | | | 0.4 | 0.1 | Octylene 1,2 epoxide | Do. |
| 0.5 | | | 0.3 | 0.2 | ----do---- | Do. |
| 1.0 | | | 1.6 | 0.5 | Polytetramethylenediol diisocyanate. | Do. |
| 0.5 | | | 0.5 | | | Do. |

As can be seen, the bark derivatives function as curing agents or hardeners by virtue of their free carboxylic acid groups or free phenolic hydroxyl groups which enter into the final polymer matrix and become an integral part thereof. These derivatives are not to be classified as inert fillers such as coal tar for they cannot be extracted from the cured blend in any way by organic solvents.

While various specific examples of preferred procedure embodying the above invention have been described above, it will be apparent that many changes and modifications may be made in those methods of procedure without departing from the spirit of the invention. It should, therefore, be understood that the examples cited and the methods of procedures set forth above are intended to be illustrative only and not intended to limit the scope of the invention.

What is claimed is:

1. A curable composition comprising
   (1) an epoxy resin having a plurality of 1-2-epoxy groups, and
   (2) a water insoluble ester product from the reaction of an esterifiable alcohol with a bark phenolic acid obtained by alkali extraction of bark.

2. The composition according to claim 1 wherein the epoxy compound is selected from the group consisting of alicyclic polyepoxides, epoxidized polybutadienes, polyglycidyl esters, polyglycidyl ethers, polyepoxy compounds obtained by reacting an amine with epichlorohydrin in the presence of alkali, and mixtures thereof.

3. Composition according to claim 1 wherein the alcohol is an aliphatic alcohol having from 1 to 18 carbon atoms.

4. The composition according to claim 1 wherein the alcohol is an esterifiable alcohol having 2 or 3 hydroxyl groups and from 2 to 80 carbon atoms.

5. The composition according to claim 4 wherein the polyhydric alcohol is one selected from the group consisting of 1,3-butyleneglycol, 1,2,6-hexanetriol, polyethyleneoxydiols having molecular weights ranging from 200 to 500 polypropyleneoxydiols having molecular weights ranging from 400 to 1200, polybutyleneoxydiols having an average molecular weight of 500, diethyleneglycol, triethyleneglycol, propyleneglycol, polyepichlorohydringlycol, and mixtures thereof.

6. The composition according to claim 1 wherein the alcohol is allyl alcohol.

References Cited

UNITED STATES PATENTS 2,845,450  7/1958  Anderson et al. ____ 260—473.5
2,890,231  6/1959  Heritage et al. ____ 260—412.5

WILLIAM H. SHORT, Primary Examiner

E. NIELSEN, Assistant Examiner

U.S. Cl. X.R.
260—47, 75, 473.6